(12) United States Patent
McDaniel

(10) Patent No.: US 8,016,092 B2
(45) Date of Patent: Sep. 13, 2011

(54) MAGNETO-RHEOLOGICAL CLUTCH AND WHEEL TRANSMISSION APPARATUSES AND METHODS

(75) Inventor: Andrew Joseph McDaniel, Chapel Hill, NC (US)

(73) Assignee: Honda Motor Co., Ltd., Tokyo (JP)

( * ) Notice: Subject to any disclaimer, the term of this patent is extended or adjusted under 35 U.S.C. 154(b) by 750 days.

(21) Appl. No.: 12/111,611

(22) Filed: Apr. 29, 2008

(65) Prior Publication Data
US 2009/0266666 A1    Oct. 29, 2009

(51) Int. Cl.
    F16D 67/06    (2006.01)
    F16D 37/02    (2006.01)
    E01H 5/09     (2006.01)
    A01D 69/08    (2006.01)

(52) U.S. Cl. .............. 192/12 A; 192/21.5; 192/48.2; 188/267.2; 56/11.3; 56/11.8; 37/259

(58) Field of Classification Search .............. 37/259; 56/11.3, 11.7, 11.8; 188/272; 192/216, 12 A
See application file for complete search history.

(56) References Cited

U.S. PATENT DOCUMENTS

| | | | |
|---|---|---|---|
| 2,417,850 A | 3/1947 | Winslow | |
| 2,525,571 A | 10/1950 | Winther | |
| 2,548,373 A | 4/1951 | Hurvitz | |
| 2,557,140 A | 6/1951 | Razdowitz | |
| 2,573,065 A | 10/1951 | Salemme | |
| 2,575,360 A * | 11/1951 | Rabinow | 192/21.5 |
| 2,603,103 A | 7/1952 | Sohon et al. | |
| 2,605,875 A | 8/1952 | Stephenson | |
| 2,607,542 A | 8/1952 | Spillman | |
| 2,616,539 A | 11/1952 | Wattenberger | |
| 2,639,414 A | 5/1953 | Gould | |
| 2,684,138 A | 7/1954 | Buckman | |
| 2,685,947 A | 8/1954 | Votrian | |
| 2,695,675 A | 11/1954 | Frye | |
| 2,732,921 A | 1/1956 | Rabinow | |
| 2,886,151 A | 5/1959 | Winslow | |
| 2,903,109 A | 9/1959 | Didszuns | |
| 3,216,542 A | 11/1965 | Comstock | |
| 3,255,853 A | 6/1966 | Klass et al. | |
| 4,122,652 A * | 10/1978 | Holtermann | 56/11.3 |
| 4,664,236 A | 5/1987 | Stangroom | |
| 4,896,754 A | 1/1990 | Carlson et al. | |
| 5,007,303 A | 4/1991 | Okuzumi | |
| 5,007,513 A | 4/1991 | Carlson | |
| 5,018,592 A * | 5/1991 | Buchdrucker | 180/19.3 |
| 5,105,928 A | 4/1992 | Saeki et al. | |
| 5,119,918 A * | 6/1992 | Pardee | 192/18 B |

(Continued)

*Primary Examiner* — Richard M. Lorence
(74) *Attorney, Agent, or Firm* — Jenkins, Wilson, Taylor & Hunt, P.A.

(57) ABSTRACT

Magneto-rheological clutch and wheel transmission apparatuses and methods are provided. According to one aspect, a magneto-rheological clutch system can include first and second drive members and first and second driven members. A first gap can be present between the first drive and first driven members. A second gap can be present between the second drive and second driven members. A drive wheel and a snow blower impeller can be connected to the first and second driven member, respectively. First and second MR fluids can be disposed in the first and second gaps, respectively. A first magnetic field can be applied to the first MR fluid for engaging the drive wheel. A second magnetic field can be applied to the second MR fluid for engaging the snow blower impeller. The provided apparatuses and methods can also be applied to mower blades and wheels.

12 Claims, 12 Drawing Sheets

U.S. PATENT DOCUMENTS

| | | |
|---|---|---|
| 5,398,917 A | 3/1995 | Carlson et al. |
| 5,615,540 A | 4/1997 | Yang |
| 5,848,678 A | 12/1998 | Johnston et al. |
| 5,915,513 A | 6/1999 | Isley, Jr. et al. |
| 6,158,910 A | 12/2000 | Jolly et al. |
| 6,186,290 B1 | 2/2001 | Carlson |
| 6,308,813 B1 | 10/2001 | Carlson |
| 6,314,612 B1 | 11/2001 | Rennecke et al. |
| 6,471,018 B1 | 10/2002 | Gordaninejad et al. |
| 6,527,664 B2 | 3/2003 | Hunt |
| 6,581,740 B2 | 6/2003 | Szalony |
| 6,611,185 B2 | 8/2003 | Carlson et al. |
| 6,655,490 B2 | 12/2003 | Andonian et al. |
| 6,662,477 B2 * | 12/2003 | Dowe et al. ............ 37/257 |
| 6,702,221 B2 | 3/2004 | Haber et al. |
| 6,837,830 B2 | 1/2005 | Eldridge |
| 6,854,573 B2 | 2/2005 | Jolly et al. |
| 6,910,699 B2 | 6/2005 | Cherney |
| 7,133,166 B2 | 11/2006 | Ferlitsch et al. |
| 7,198,140 B2 | 4/2007 | Jolly et al. |
| 2006/0180372 A1 | 8/2006 | Mercier et al. |
| 2006/0197741 A1 | 9/2006 | Biggadike |
| 2006/0254871 A1 | 11/2006 | Murty et al. |

\* cited by examiner

MAGNETO-RHEOLOGICAL CLUTCH AND WHEEL TRANSMISSION APPARATUSES AND METHODS

TECHNICAL FIELD

The subject matter disclosed herein relates generally to clutching mechanisms for power equipment. More particularly, the subject matter disclosed herein relates to magneto-rheological (MR) clutch and wheel transmission apparatuses and methods for power equipment.

BACKGROUND

With operator safety in mind, power equipment, particularly mowing machines, typically feature safety devices such as a blade brake clutch (BBC) control. A BBC can include a clutch that selectively engages a blade or blades associated with an engine output member. A brake can also be included that retards the rotation of the blade when the blade is disengaged from the engine output member. The combination of these two coupling devices permits an operator to control the movement of mower blade independent of the engine output member. Further, when coupled to an operator presence control, such as a bail, the BBC ensures operator safety by rapidly retarding a mower blade upon release of the bail.

Typically, the components utilized in a clutch are separate and distinct from those employed by a brake and provide a bulky complicated arrangement. For example, in a centrifugal BBC, a clutch drum that can be engaged with a peripheral brake caliper assembly is often used. The clutch drum houses clutch shoes to engage the clutch drum to spin the blade at specified rotational speeds. To brake the clutch drum to prevent rotation after disengagement of the clutch shoes, the brake caliper assembly usually has brake shoes positioned around the side walls of the clutch drum to brake the clutch drum. Thereby, the blade attached to the clutch drum stops rotating.

This type of BBC must be designed to withstand significant mechanical forces applied during operation and may require substantial maintenance. Further, this arrangement creates a large number of parts for assembly as well as for replacement during maintenance. Dimensional constraints are another drawback of conventional BBC control apparatuses. A large surface area is desirable for both the brake and the clutch, however, packaging space often constricts these areas below the optimum values.

Magneto-rheological technology allows for rapid and controllable manipulation of mechanical devices. The apparent viscosity and thus torque capacity of a magneto-rheological fluid is directly proportional to the magnetic flux density applied to it. Therefore, the torque capacity of the fluid can be rapidly controlled by controlling the applied magnetic field.

Therefore, in light of the above, a need exists for clutch control apparatuses and methods that capture the advantages provided by MR technology and are easy to use and operator friendly, so as to allow for the clutching of a power equipment machine while reducing the mechanical complexity, the number of required mechanical parts and the amount of space required for operation.

SUMMARY

In accordance with this disclosure, MR clutch and wheel apparatuses and methods are provided. It is, therefore, an object of the present disclosure to provide MR clutch and wheel apparatuses and methods that can be used in power equipment. This, and other objects as may become apparent from the present disclosure, is achieved, at least in whole or in part, by the subject matter described herein.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures in which.

DETAILED DESCRIPTION

Reference will now be made in detail to presently preferred embodiments of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

Figure 1:
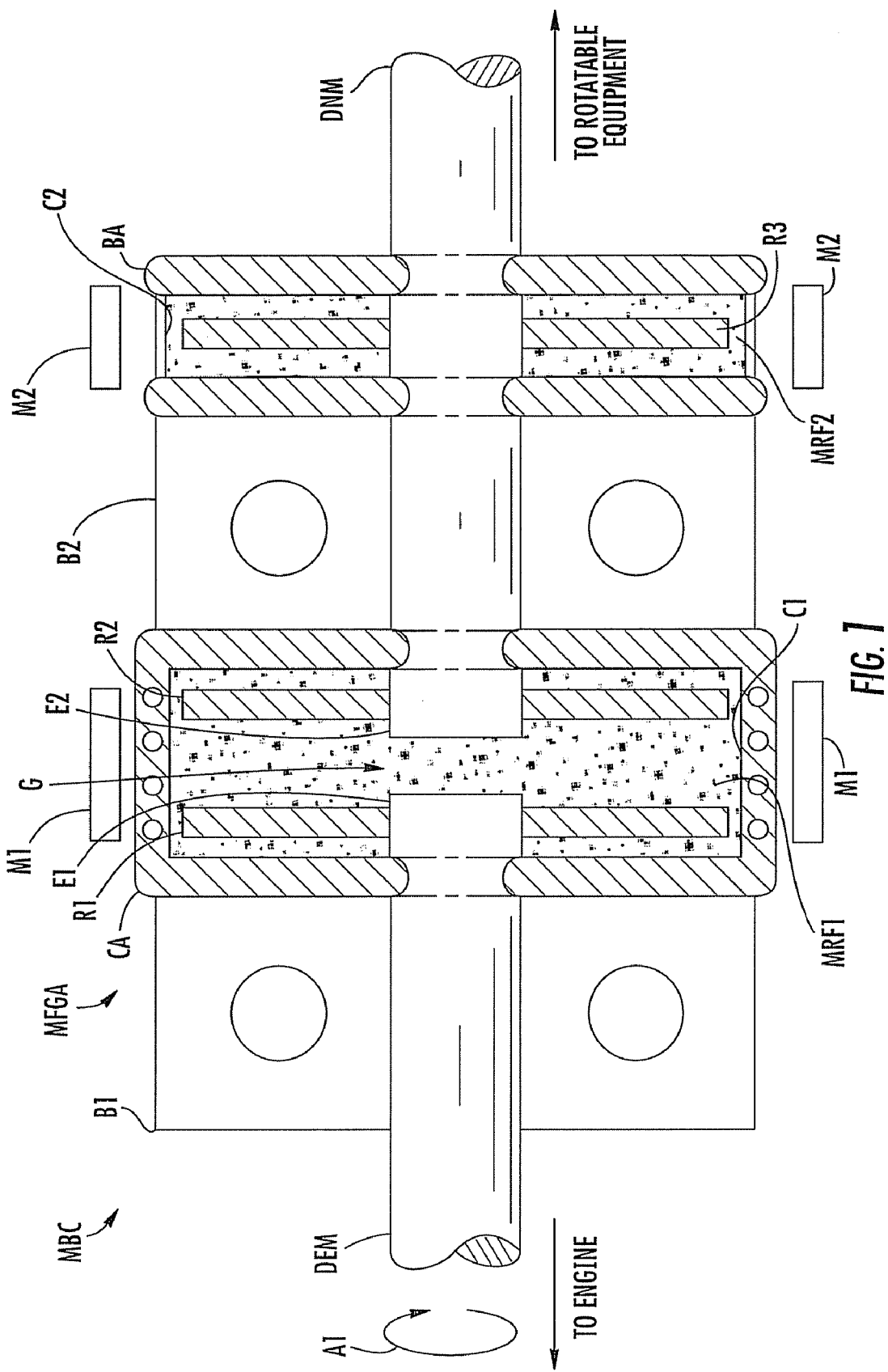
FIG. 1 is a schematic cross-sectional side view of an MR brake-clutch according to an embodiment of the subject matter disclosed herein.

Referring now to FIG. 1, an MR brake-clutch generally designated MBC is illustrated by way of example. MR brake-clutch MBC can comprise any suitable configuration generally known to persons skilled in the art or later developed. In one aspect, MR brake-clutch MBC can comprise drive member DEM and a driven member DNM such as a drive shaft and a driven shaft, respectively. Drive member DEM can include a terminal end E1 connected to a disk-shaped rotor R1. A connecting end of drive member DEM that opposes terminal end E1 can be connected to an internal combustion engine in a manner known to those of skill in the art for rotation of drive member DEM at engine speed or some selected proportion thereof. In particular, drive member DEM can comprise an axial shaft, which can be rotated in a direction indicated by direction arrow A1 by the engine. Due to the connection of rotor R1 to drive member DEM, rotor R1 can also be rotated by the engine together with drive member DEM.

Driven member DNM can comprise a rotatable axial shaft having a terminal end E2 and an opposing connecting end (not shown). Terminal end E2 can be connected to a disk-shaped rotor R2. The opposing connecting end of driven member DNM can be connected to a mower blade, snow blower impeller, lawn mower wheel, snow blower wheel, wheel transmission, or like equipment (not shown) that can be rotated together with driven member DNM. Driven member DNM can be coaxially aligned with drive member DEM and separated at terminal ends E1 and E2 by a gap generally designated G.

Rotors R1 and R2 can be any suitably sized and shaped rotors for operating in MR fluid. For example, rotors R1 and R2 can be identically shaped. Further, for example, rotors R1 and R2 can include one or more grooves or irregularities. Rotors R1 and R2 can be made of any suitable material such as, for example, a rigid metal material.

A clutch assembly CA can define a chamber C1 containing a quantity of MR fluid MRF1, which can comprise a suspension of solid particles. Terminal ends E1 and E2 of drive member DEM and driven member DNM, respectively, can extend into chamber C1 through openings defined by clutch assembly CA. The openings and terminal ends E1 and E2 can be sealed with respect to one another for preventing MR fluid MRF1 from leaking out of chamber C1. Further, drive member DEM and driven member DNM can be connected to ball bearing assemblies B1 and B2, respectively, which operably engage exterior surfaces of clutch assembly CA such that the members can freely rotate with respect to clutch assembly CA. Further, clutch assembly CA can comprise a needle roller bearing for reducing friction.

When MR fluid MRF1 is exposed to a magnetic field, the flow threshold yield stress increases as the flux density of the magnetic field increases. Yield stress is also known to increase as the volume fraction of solid particles in the suspension increases. Accordingly, a desired yield stress for a selected MR fluid can be achieved by controlling the volume fraction of suspended particles.

A magnetic field generation assembly generally designed MFGA can be configured to selectively apply a magnetic field to MR fluid MRF1 for controlling engagement of driven member DNM with drive member DEM. Particularly, drive member DEM can engage driven member DNM when assembly MFGA moves a permanent magnet M1 to a position near MR fluid MRF1 such that rotors R1 and R2 engage one another. In this example, MR fluid MRF1 carries a selected volume percent of solid particles and causes rotors R1 and R2 to engage one another when magnet is positioned sufficiently close to MR fluid MRF1. When drive member DEM engages driven member DNM and magnet M1 is positioned sufficiently close to MR fluid MRF1 such that rotors R1 and R2 engage one another, rotational movement of drive member DEM by the motor, or any other suitable primer mover, can be translated to driven member DNM for causing rotation of attached equipment such as a mower blade, a snow blower impeller, or like rotatable equipment.

Conversely, MR fluid MRF1 permits substantially complete slippage between rotors R1 and R2 when magnet M1 and MR fluid MRF1 are separated by more than a certain threshold distance. As a result, drive member DEM disengages from driven member DNM. When driven member DNM and drive member DEM are disengaged, driven member DNM can move freely with respect to the rotation of drive member DEM.

Magnetic field generation assembly MFGA can be configured to controllably vary the strength of the magnetic field applied to MR fluid MRF1 for continuously varying engagement of driven member DNM with drive member DEM. In particular, magnet M1 can be positioned at varying distances from MR fluid MRF1 such that the strength of the magnetic field applied to MR fluid MRF1 is varied. As a result different yield stresses for MR fluid MRF1 can be achieved. Thus, by varying the magnetic field strength, the degree to which rotors R1 and R2 engage one another or the amount of slippage can be controllably varied. Thereby, the rate at which driven member DNM rotates with respect to the rotation of drive member DEM can be selectively varied.

An MR brake assembly BA can be configured to control braking of member DNM. In particular, brake assembly BA can define a chamber C2 for containing a quantity of MR fluid MRF2. Driven member DNM can be connected to a rotor R3 positioned within chamber C2. Alternatively, rotor R3 can be any suitable braking structure. Driven member DNM can be held in position or its rotation resisted or stopped by selectively positioning a permanent magnet M2 sufficiently near MR fluid MRF2. Because of the connection of the rotatable equipment to driven member DNM, the rotation of the rotatable equipment connected to driven member DNM can also be slowed or stopped by selective positioning of magnet M2 sufficiently near MR fluid MRF2.

Conversely, magnetic field generation assembly MFGA can position magnet M2 a sufficient distance from MR fluid MRF2 such that substantial slippage is permitted between rotor R3 and brake assembly BA. As a result, driven member DNM can disengage from brake assembly BA. When driven member DNM and brake assembly BA are disengaged, driven member DNM can move freely with respect to brake assembly BA.

Magnetic field generation assembly MFGA can be configured to controllably vary the strength of the magnetic field applied to MR fluid MRF2 for continuously varying engagement of driven member DNM with brake assembly BA. In particular, magnet M2 can be positioned at varying distances from MR fluid MRF2 such that the strength of the magnetic field applied to MR fluid MRF2 is varied. As a result different yield stresses for MR fluid MRF2 can be achieved. Thus, by varying the magnetic field strength, the degree to which rotor R3 engages brake assembly BA or the amount of slippage can be controllably varied. Thereby, the amount of resistance or braking applied to drive member DEM can be selectively varied.

Driven member DNM can extend through chamber C2 through openings defined by brake assembly BA. The openings and driven member DNM can be sealed with respect to one another for preventing MR fluid MRF2 from leaking out of chamber C2. Further, bearing assembly B2 can operably engage an exterior surface of brake assembly BA such that driven member DNM can freely rotate with respect to clutch assembly CA when braking is not applied.

Magnetic field generation assembly MFGA can be configured to control magnets M1 and M2 such that members DEM and DNM are not engaged with one another at the same time that rotor R3 is engaged with brake assembly BA. In particular, magnets M1 and M2 can be controlled such that magnet M1 is not sufficiently close to MR fluid MRF1 to cause engagement of rotors R1 and R2 at the same time that magnet M2 is positioned sufficiently close to MR fluid MRF2 to cause engagement of rotor R3 with brake assembly BA. As a result of the coordinated control of magnets M1 and M2, the risk of damage to the motor and rotatable equipment is reduced because the brake is prevented from being engaged at the same time that the motor is rotating both the drive and driven members.

Figure 2:
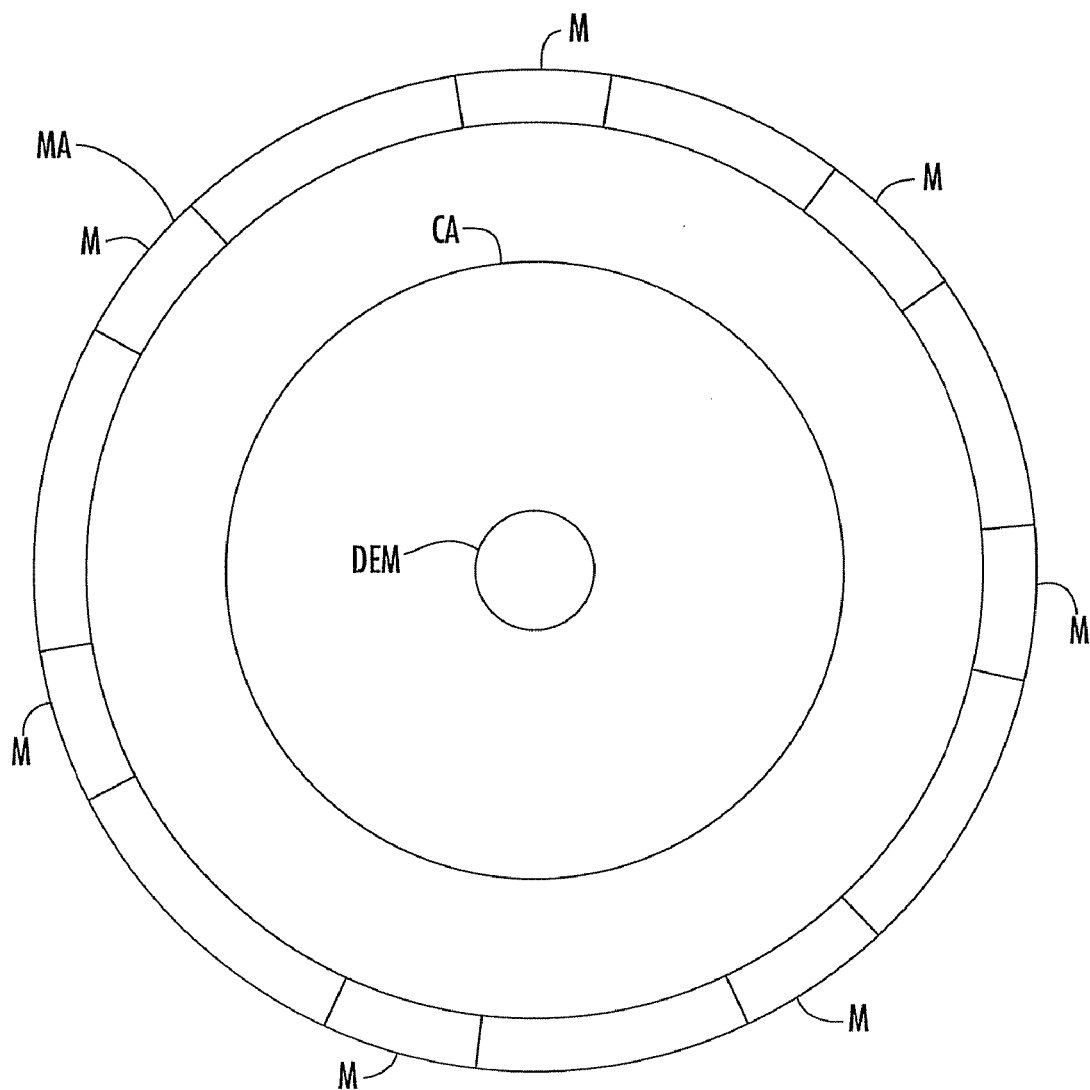
FIG. 2 is a schematic, cross-sectional front view of an exemplary ring-shaped magnet assembly substantially surrounding a drive member and a clutch assembly according to an embodiment of the subject matter described herein.

In this example, magnets M1 and M2 can each be substantially ring-shaped and can be positioned to substantially surround MR fluids MRF1 and MRF2, respectively. FIG. 2 is a schematic, cross-sectional front view of an exemplary ring-shaped magnet assembly MA substantially surrounding a drive member DEM and clutch assembly CA according to an embodiment of the subject matter described herein. Similarly, in the alternative, such a magnet assembly can surround a drive member and brake assembly. Referring to FIG. 2, magnet assembly MA can include a plurality of individual permanent magnets M spaced substantially evenly around the circumference of magnet assembly MA. Further, magnet assembly MA can comprise any suitable structure and material for forming a collar shape.

Magnet assembly MA can be controllably positioned by a magnetic field generation assembly at different distances with respect to clutch assembly CA. In particular, magnet assembly MA can be moved in a direction substantially parallel to the axial length of drive member DEM such that magnets M are positioned at different distances with respect to the MR fluid within clutch assembly CA. As a result, magnets M can be moved to change the magnetic field applied to the MR fluid in clutch assembly CA, thus causing the rotor of drive member DEM to selectively engage clutch assembly CA.

Figure 3A:
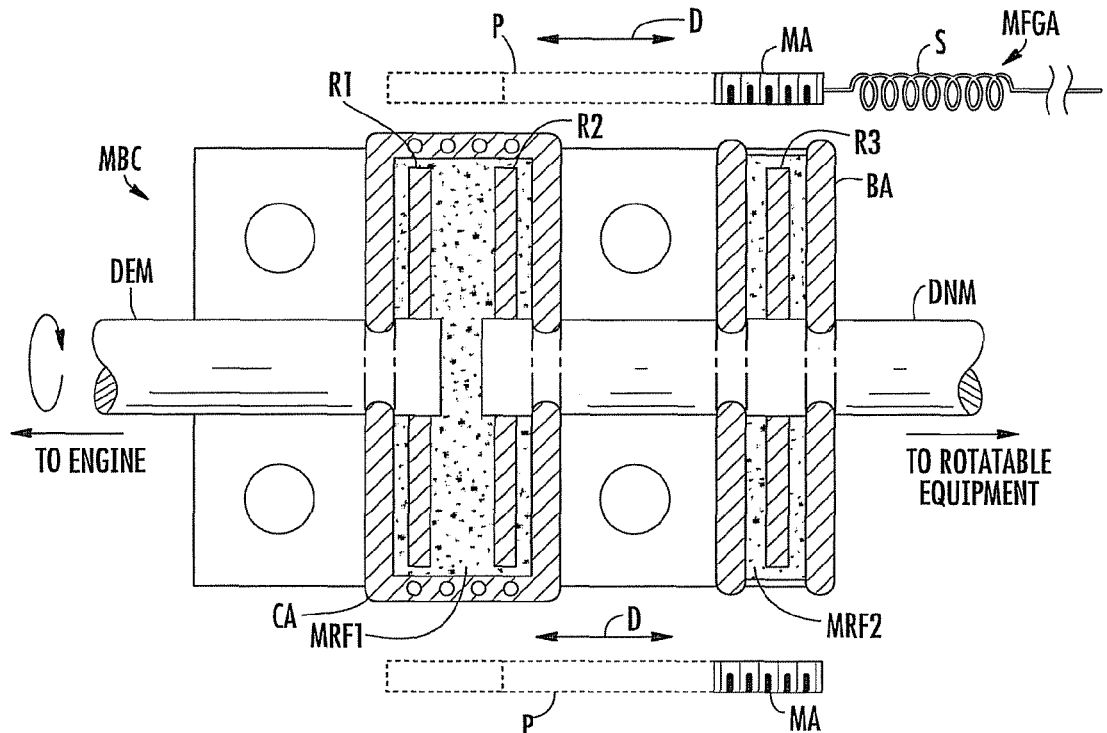
FIGS. 3A and 3B are cross-sectional side views of an MR brake-clutch including a magnet in different brake-clutch positions for engaging the brake and clutch assemblies, respectively, according to an embodiment of the subject matter described herein.
Figure 3B:
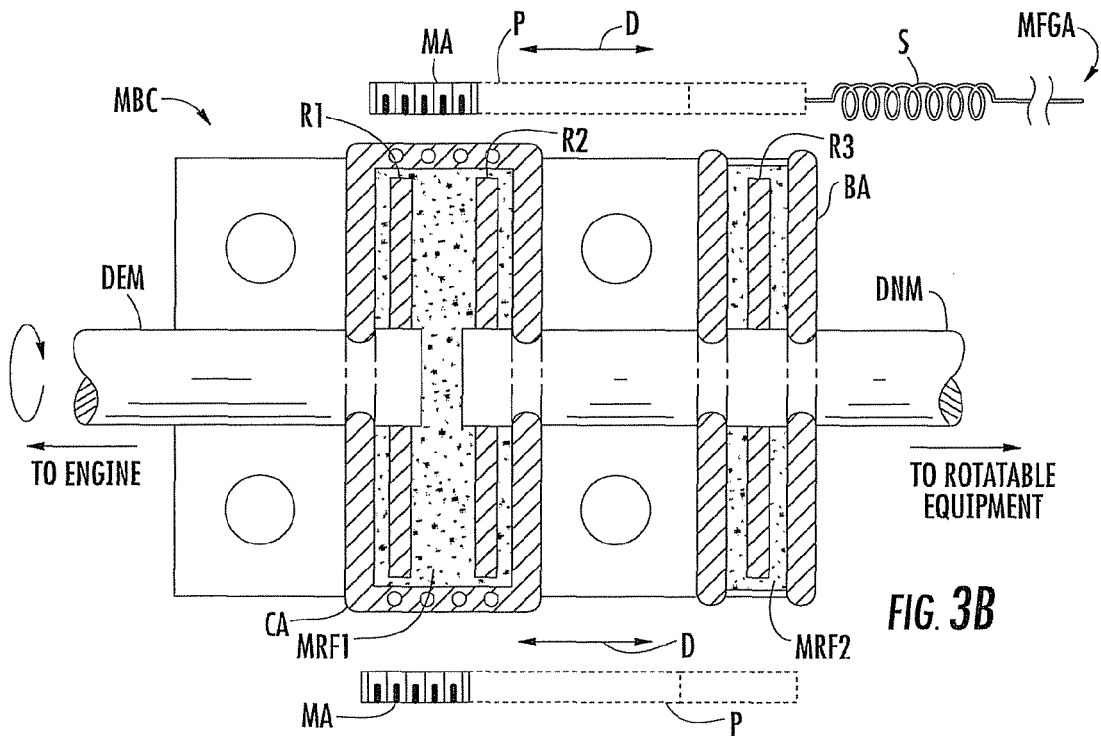

FIGS. 3A and 3B illustrate an MR brake-clutch generally designated MBC including a magnet in different brake-clutch positions for engaging the brake and clutch assemblies, respectively, according to an embodiment of the subject matter described herein. Referring to FIG. 3A, MR brake clutch MBC can comprise magnetic field generation assembly MFGA that can include a magnet assembly MA positioned near MR fluid MRF2 of brake assembly BA for engagement of the brake. Particularly, in this position, the proximity of the magnets of magnet assembly MA to MR fluid MRF2 generates a magnetic field of sufficient strength such that rotor R3 engages brake assembly BA. Further, in this position, the magnets of magnet assembly MA are separated from MR fluid MRF1 such that the magnetic field generated by the magnets does not cause rotors R1 and R2 to engage one another.

Assembly MFGA can include a return spring S including one end connected to magnet assembly MA and an opposing end connected to suitable mechanical components for positioning magnet M in the position near MR fluid MRF2 as shown in FIG. 3A. The positioning of magnet M near MR fluid MRF2 is a default safe position. In one example, an operator can move a bail for moving the magnet to an operational position near MR fluid MRF1 where drive and driven members DEM and DNM engage one another. A release of the bail results in spring S returning magnet M to the safe position where the movement of driven member DNM is resisted and where drive and driven members DEM and DNM, respectively, disengage one another.

Referring to FIG. 3B, spring S and its associated components of assembly MFGA can position magnet assembly MA near MRF1 of clutch assembly CA for engaging drive member DEM with driven member DNM. Assembly MFGA is suitable for positioning magnet assembly MA between the position near MR fluid MRF1 shown in FIG. 3B and the position near MR fluid MRF2 shown in FIG. 3A. Magnet M can move between the two positions by following a path P (indicated by broken lines) that can extend substantially along the same direction D as the axes of members DEM and DNM.

In the position near MR fluid MRF1 shown in FIG. 3B, the proximity of the magnets of magnet assembly MA to MR fluid MRF1 can generate a magnetic field of sufficient strength such that rotors R1 and R2 can engage one another. Further, in this position, the magnets of magnet assembly MA can be separated from MR fluid MRF2 such that the magnetic field generated by the magnets does not cause rotor R3 to engage brake assembly BA.

Magnetic field generation assembly MFGA can be configured to controllably vary the strengths of the magnetic field applied to MR fluids MRF1 and MRF2 for continuously varying engagement of driven member DNM with drive member DEM and for continuously varying engagement of driven member DNM with brake assembly BA. In particular, magnet assembly MA can be variably positioned along path P such that the strengths of the applied magnetic fields can vary. As magnet assembly MA is positioned more closely to MR fluid MRF1, the degree to which rotors R1 and R2 engage one another can increase or the amount of slippage can decrease. Conversely, as magnet assembly MA is positioned more closely to MR fluid MRF2, the amount of resistance or braking applied to drive member DEM can be selectively varied.

Figure 3C:
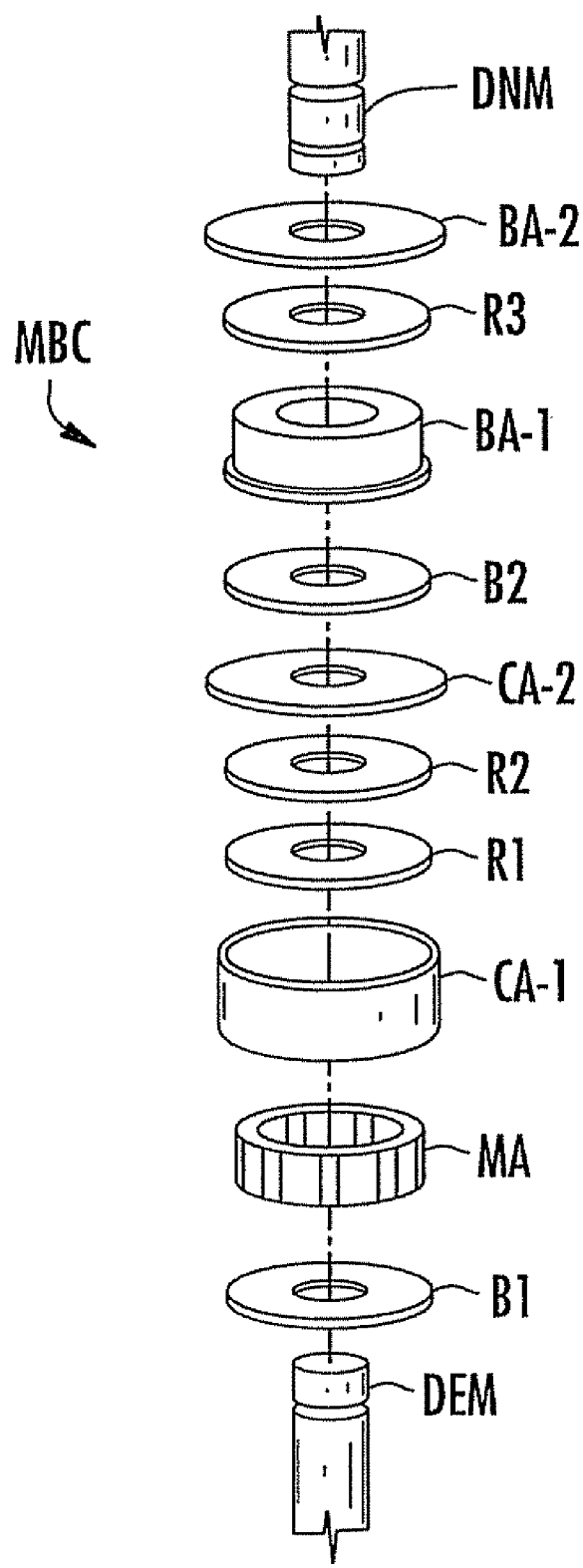
FIG. 3C is an exploded view of the MR brake-clutch shown in FIGS. 3A and 3B according to an embodiment of the subject matter described herein.

FIG. 3C is an exploded view of MR brake-clutch MBC shown in FIGS. 3A and 3B. Brake assembly BA is shown as two components BA-1 and BA-2 that can be assembled together for defining a chamber for containing MR fluid. Further, clutch assembly CA is shown as two components CA-1 and CA-2 that can be assembled together for defining a chamber for containing MR fluid. While it is envisioned that MR brake-clutch MBC can be adapted for any suitable use, MR brake-clutch MBC in FIG. 3C is illustrated in an exploded view for assembly with a motor and a mower blade and/or one or more wheels associated with a mower. Alternatively, MR brake-clutch MBC can be adapted for assembly with a motor and impeller and/or one or more wheels of a snow blower.

Figures 4A, 4B:
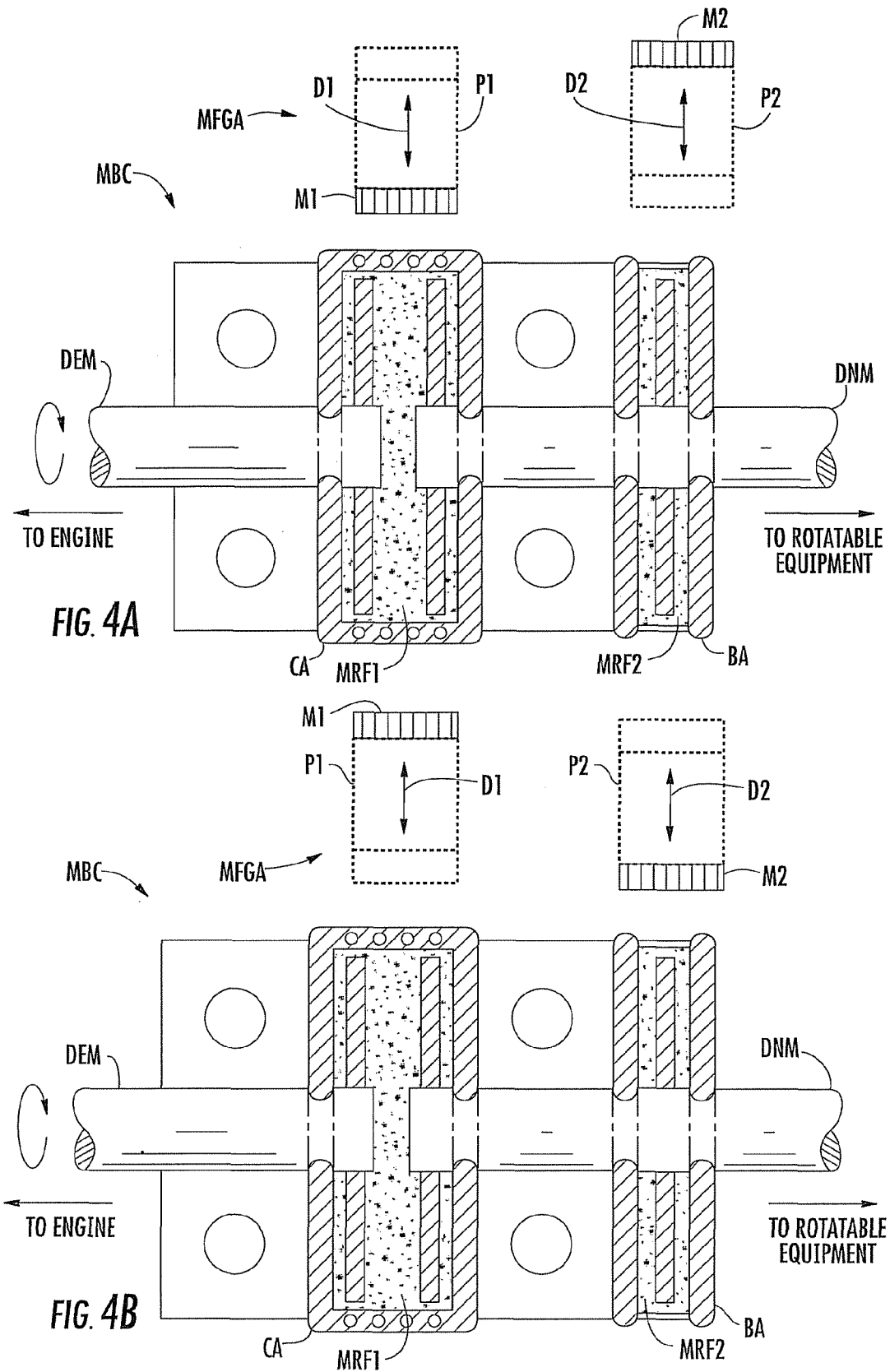
FIGS. 4A and 4B are cross-sectional side views of an MR brake-clutch including a magnet in different brake-clutch positions for engaging the brake and clutch assemblies, respectively, according to an embodiment of the subject matter described herein.

FIGS. 4A and 4B illustrate an MR brake-clutch generally designated MBC including a magnet in different brake-clutch positions for engaging the brake and clutch assemblies, respectively, according to an embodiment of the subject matter described herein. Referring to FIG. 4A, MR brake clutch MBC can comprise magnetic field generation assembly MFGA that can include a permanent magnet M1 positioned near MR fluid MRF1 of clutch assembly CA for engagement of rotors R1 and R2 with one another. Particularly, in this position, the proximity of magnet M1 to MR fluid MRF1 can generate a magnetic field of sufficient strength such that rotors R1 and R2 engage one another.

Further, while magnet M1 is in position near MR fluid MRF1, assembly MFGA can position a permanent magnet M2 at a distance sufficiently far from MR fluid MRF2 such that rotor R3 does not engage brake assembly BA. As a result, members DEM and DNM can engage one another while the brake is not being operated.

Referring to FIG. 4B, magnets M1 and M2 can be repositioned such that magnet M1 is further from MR fluid MRF1 and magnet M2 is closer to MR fluid MRF2 than the positioning of the magnets shown in FIG. 4A. Magnet M1 can be positioned sufficiently far away from MR fluid MRF1 such that rotors R1 and R2 are not engaged with one another, and, therefore, members DEM and DNM can move freely with respect to one another. Further, magnet M2 can be positioned sufficiently close to one another such that rotor R3 engages brake assembly BA, and, therefore, member DNM rotation of member DNM is resisted or stopped by brake assembly BA.

Magnets M1 and M2 can be moved in directions D1 and D2, respectively, along paths P1 and P2, respectively, which can extend substantially radially from the axes of members DEM and DNM. Any suitable type of controllable mechanical components can be used for controlling the movement of magnets M1 and M2 along paths P1 and P2, respectively.

Magnetic field generation assembly MFGA can be configured to controllably vary the strengths of the magnetic field applied to MR fluids MRF1 and MRF2 for continuously varying engagement of driven member DNM with drive member DEM and for continuously varying engagement of driven member DNM with brake assembly BA. In particular, magnets M1 and M2 can be variably positioned along paths P1 and P2 such that the strengths of the applied magnetic fields can vary. As magnet M1 is positioned more closely to MR fluid MRF1, the degree to which rotors R1 and R2 engage one another can increase or the amount of slippage can decrease. As magnet assembly M2 is positioned more closely to MR fluid MRF2, the amount of resistance or braking applied to drive member DEM can be selectively varied.

Figure 5:
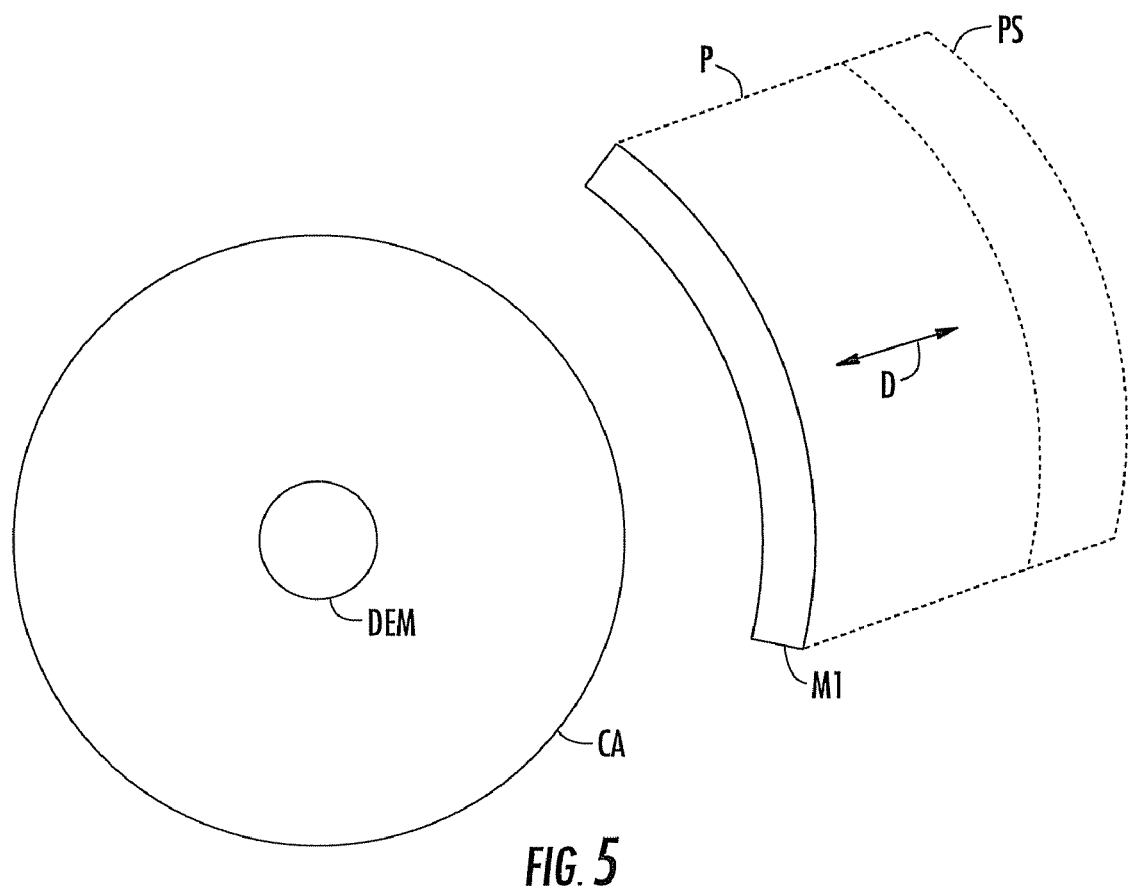
FIG. 5 is a schematic, cross-sectional front view of an exemplary magnet having a partial ring shape and partially surrounding a drive member and a clutch assembly according to an embodiment of the subject matter described herein.

FIG. 5 is a schematic, cross-sectional front view of an exemplary magnet M1 having a partial ring shape and extending partially around a drive member DEM and a clutch assembly CA according to an embodiment of the subject matter described herein. Similarly, in the alternative, such a magnet assembly can partially surround a drive member and brake assembly. Referring to FIG. 5, magnet M1 can be selectively moved between the shown position shown and a position PS for selectively applying a magnetic field having a variable strength to the MR fluid in clutch assembly CA for controlling engagement of the rotors of drive member DEM and a driven member. Magnet M1 can be moved in directions D along path P, which can extend substantially radially from the axis of member DEM. Any suitable type of controllable mechanical components can be used for controlling the movement of magnet M1 along path P.

An electromagnet is an alternative to a permanent magnet for applying a magnetic field with a controllable variable strength to MR fluid. Generally, electromagnets can generate a magnetic field when a current is applied thereto. The strength of the generated magnetic field can be varied by varying the applied current. In accordance with the subject matter disclosed herein, an electromagnet can be positioned near MR fluid of a clutch assembly or a brake assembly as described herein. The electromagnet can be controlled to apply a variable magnetic field to the MR fluid. Thereby, the engagement of a driven member with a drive member can be continuously varied by varying the magnetic field applied by the electromagnet to the MR fluid of the clutch assembly. Further, the engagement of the driven member with the brake assembly can be continuously varied by varying the magnetic field applied by the electromagnet to the MR fluid of the clutch assembly. The force required for operation of a bail can be reduced by the elimination of return springs on the permanent magnet(s). With an electromagnet, the bail force need only be governed by ergonomics.

Figure 6:
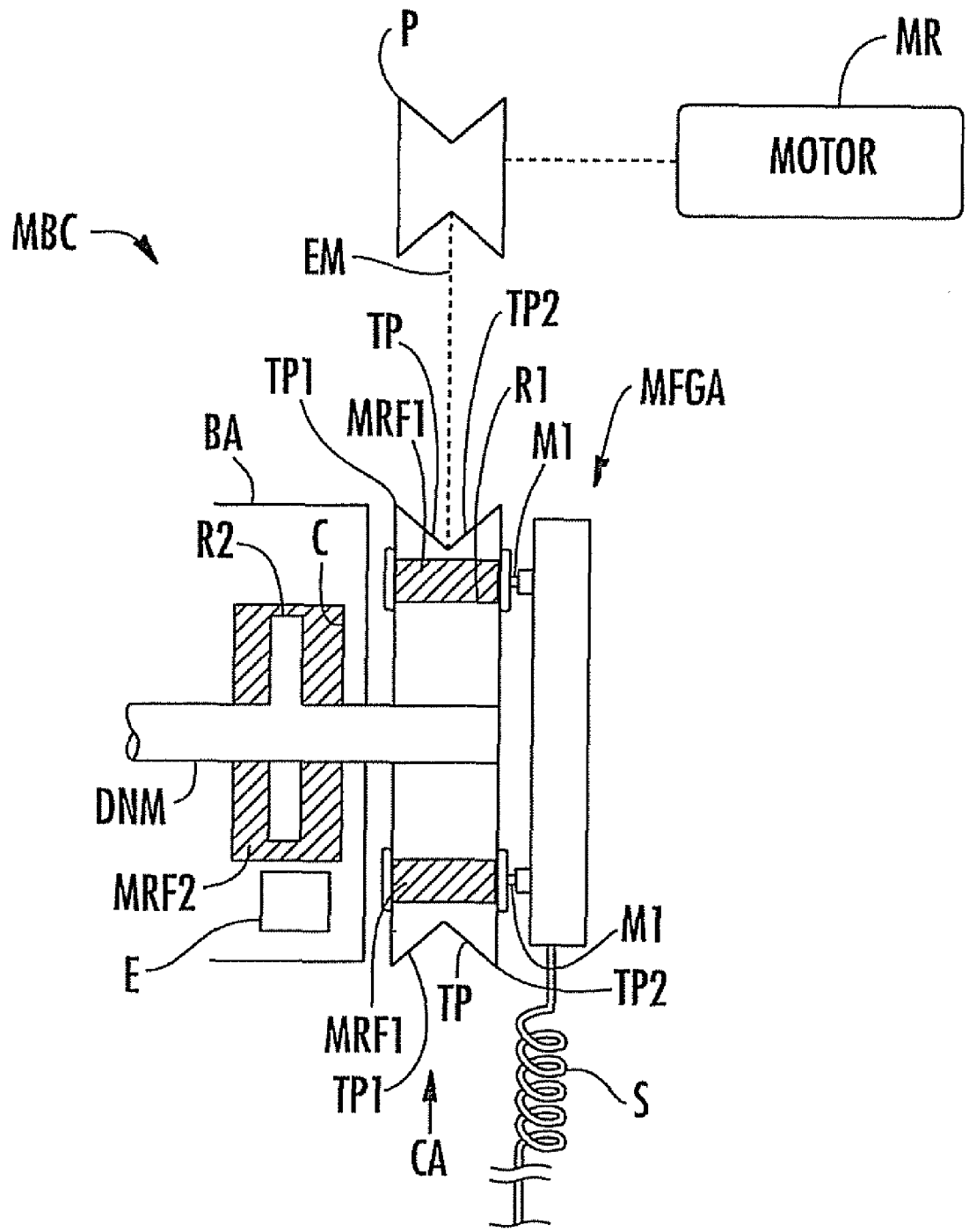
FIG. 6 is a cross-sectional side view of an MR brake-clutch including magnets in different positions for engaging brake and clutch assemblies according to an embodiment of the subject matter described herein.

FIG. 6 illustrates an MR brake-clutch generally designated MBC including magnets in different positions for engaging brake and clutch assemblies according to an embodiment of the subject matter described herein. Referring to FIG. 6, MR brake-clutch MBC can comprise magnetic field generation assembly MFGA including a magnet M1 positioned near MR fluid MRF1 for engagement of a clutch assembly generally designated CA with a rotor R1. Particularly, in this position, the proximity of magnet M1 to MR fluid MRF1 generates a magnetic field of sufficient strength such that clutch assembly CA and rotor R1 can engage one another. MR fluid MRF1 can be disposed in a sealed chamber defined between a perimeter of rotor R1 and an interior surface of clutch assembly CA.

Clutch assembly CA can include a variable pitch pulley TP. Pulley TP can comprise two flanges or halves, illustrated as a first pulley member TP1 and a second pulley member TP2. To enable the pitch or distance between first and second pulley members TP1 and TP2 to be varied, at least one of first and second pulley members TP1 and TP2 can be axially translatable along a driven member DNM relative to the other. Variable pitch pulley TP can be under tension by an endless member EM (represented by a broken line) caused by the rotation of pulley P, which can be rotated by a motor MR, or any other suitable primer mover. Pulley TP can function as a drive member with respect to driven member DNM.

Driven member DNM can be connected to rotor R1 and caused to rotate on engagement of rotor R1 with pulley TP. Magnet M1 can be connected to a magnet assembly MA, which can be moved by a return spring S in operation with suitable mechanical components. Magnet M1 can be positioned for applying a magnetic field to MR fluid MRF1 such that pulley TP can engage rotor R1. Further, magnet M1 can be moved to a position such that the magnetic field is not sufficiently great to cause engagement of pulley TP with rotor R1. When pulley TP and rotor R1 are not engaged, MR fluid MRF1 will allow rotor R1 to rotate at lower resistance with respect to pulley TP.

Driven member DNM can be operably connected to a rotor R2 positioned in a chamber C defined by a brake assembly BA. A quantity of MR fluid MRF2 can be disposed within brake assembly BA. The rotation of rotor R2 can be resisted by application of a magnetic field to MR fluid MRF2. Particularly, an electromagnet E can be controlled to selectively apply a magnetic field, to MR fluid MRF2 for controlling engagement of rotor R2 with brake assembly BA to brake driven member DNM.

Figure 7:
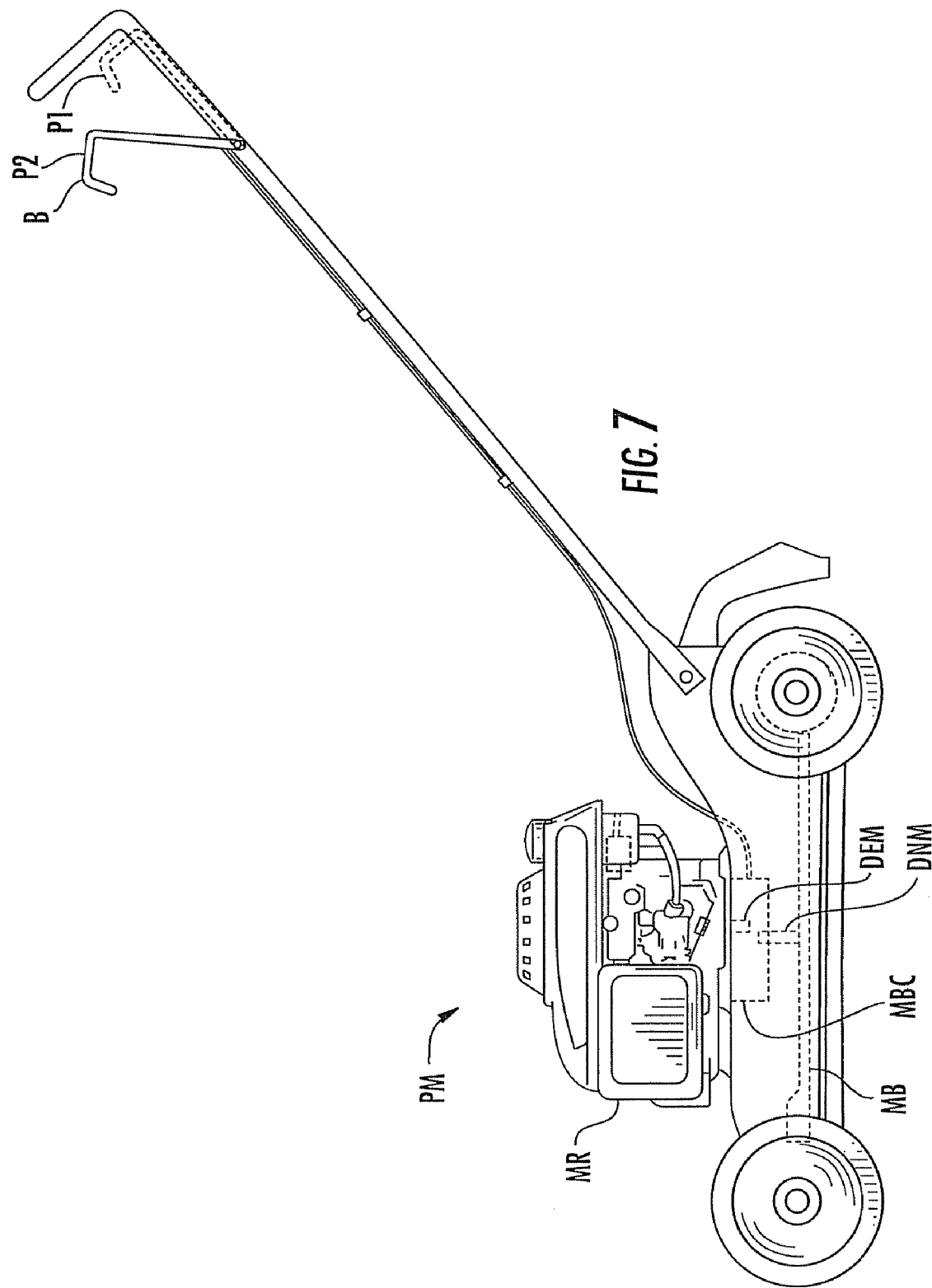
FIG. 7 is a side view of a push mower including an MR brake-clutch in accordance with an embodiment of the subject matter described herein.

A push mower can be configured to include an MR brake-clutch to engage an internal combustion motor such that the mower blade can be selectively rotated and braked. FIG. 7 is a side view of a push mower generally designated PM including an MR brake-clutch MBC (indicated by broken lines) in accordance with an embodiment of the subject matter described herein. Referring to FIG. 7, MR brake-clutch MBC can include a drive member DEM operably connected at one end to a motor MR for selective rotation of drive member DEM by motor MR. Further, MR brake-clutch MBC can include a driven member DNM connected at one end to a mower blade MB for selective rotation of mower blade MB by motor MR and for selective braking of mower blade MB by a brake assembly.

Motor MR can be throttled for rotation of drive member DEM. In particular, a bail B can be moved to a position P1 (indicated by broken lines) for maintaining engagement of members DEM and DNM. Further, motor MR can continue to run while bail B is in position P1. While bail B is in position P1, the electrical field can be applied to the MR fluid of a clutch assembly such that drive member DEM engages driven member DNM. Thus, rotation of drive member DEM can cause driven member DNM and its attached mower blade MB to rotate.

In a position P2, bail B can turn off motor MR, disengage drive member DEM from driven member DNM, and apply braking to driven member DNM. In particular, a throttle control to motor MR can be turned off. Further, the electrical field applied to the MR fluid of the clutch assembly can be removed such that drive member DEM disengages driven member DNM. Also, in this position, an electrical field can be applied to the MR fluid of the brake assembly such that the rotation of drive member DEM is resisted or stopped, resulting in the slowing and/or stopping of mower blade MB.

Further, bail B can be positioned at different positions between P1 and P2 for continuously varying engagement of driven member DNM with drive member DEM and for continuously varying engagement of driven member DNM with the brake assembly. In particular, a magnet assembly can be variably positioned along a path between the MR fluids of the clutch assembly and the brake assembly such that the strengths of the applied magnetic fields vary. As the magnet assembly is positioned more closely to the MR fluid of the clutch assembly, the degree to which the rotors engage one another increases or the amount of slippage decreases. Conversely, as the magnet assembly is positioned more closely to the MR fluid of the brake assembly, the amount of resistance or braking applied to drive member DEM can be increased.

Figure 8:
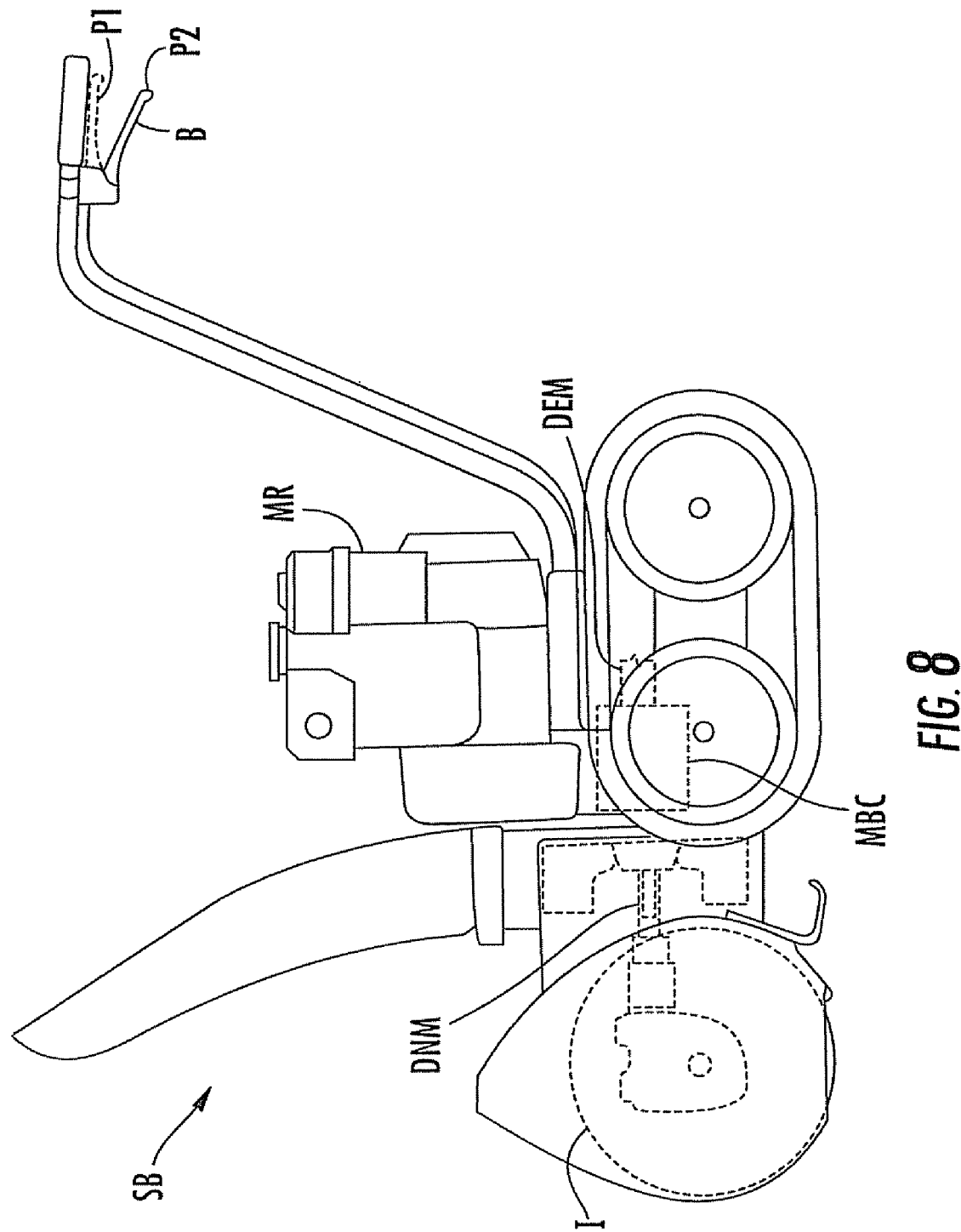
FIG. 8 is a side view of a snow blower including an MR brake-clutch in accordance with an embodiment of the subject matter described herein.

A snow blower can be configured to include an MR brake-clutch to engage an internal combustion motor such that the impeller can be selectively rotated and braked. FIG. 8 is a side view of a snow blower generally designated SB including an MR brake-clutch MBC (indicated by broken lines) in accordance with an embodiment of the subject matter described herein. Referring to FIG. 8, MR brake-clutch MBC can include a drive member DEM operably connected at one end to motor MR for selective rotation of drive member DEM by motor MR. Further, MR brake-clutch MBC can include a driven member DNM connected at one end to an impeller I for selective rotation of impeller I by motor MR and for selective braking of impeller I by a brake assembly.

Motor MR can be throttled for rotation of drive member DEM. In particular, a bail B can be moved to a position P1 (indicated by broken lines) for maintaining motor MR turned on. While bail B is in this condition, the electrical field can be applied to the MR fluid of a clutch assembly such that drive member DEM engages driven member DNM. Thus, rotation of drive member DEM can cause driven member DNM and its attached impeller I to rotate.

In a position P2, bail B can turn off motor MR, disengage drive member DEM and driven member DNM, and apply braking to driven member DNM. In particular, a throttle control to motor MR can be turned off. Further, the electrical field applied to the MR fluid of the clutch assembly can be removed such that drive member DEM disengages driven member DNM. Also, in this position, an electrical field can be applied to the MR fluid of the brake assembly such that the rotation of drive member DEM is resisted or stopped, resulting in the slowing and/or stopping of impeller I.

Further, bail B can be positioned at different positions between P1 and P2 for continuously varying engagement of driven member DNM with drive member DEM and for continuously varying engagement of driven member DNM with the brake assembly. In particular, a magnet assembly can be variably positioned along a path between the MR fluids of the clutch assembly and the brake assembly such that the strengths of the applied magnetic fields can vary. As the magnet assembly is positioned more closely to the MR fluid of the clutch assembly, the degree to which the rotors engage one another can increase or the amount of slippage can decrease. Conversely, as the magnet assembly is positioned more closely to the MR fluid of the brake assembly, the amount of resistance or braking applied to the drive member can be increased.

Power equipment can include drive wheels that are each operably connected to an MR brake-clutch for controlling the movement of the power equipment in accordance with the subject matter disclosed herein. Further, the power equipment can include one or more movable components that can be operably connected to an MR brake-clutch. For example, the power equipment can include a mower blade, snow blower impeller, lawn mower wheel, snow blower wheel, wheel transmission, or like equipment that can be rotated together with a driven member. The MR brake-clutch apparatuses of the power equipment can each be individually controlled for operation of the power equipment.

Figure 9:
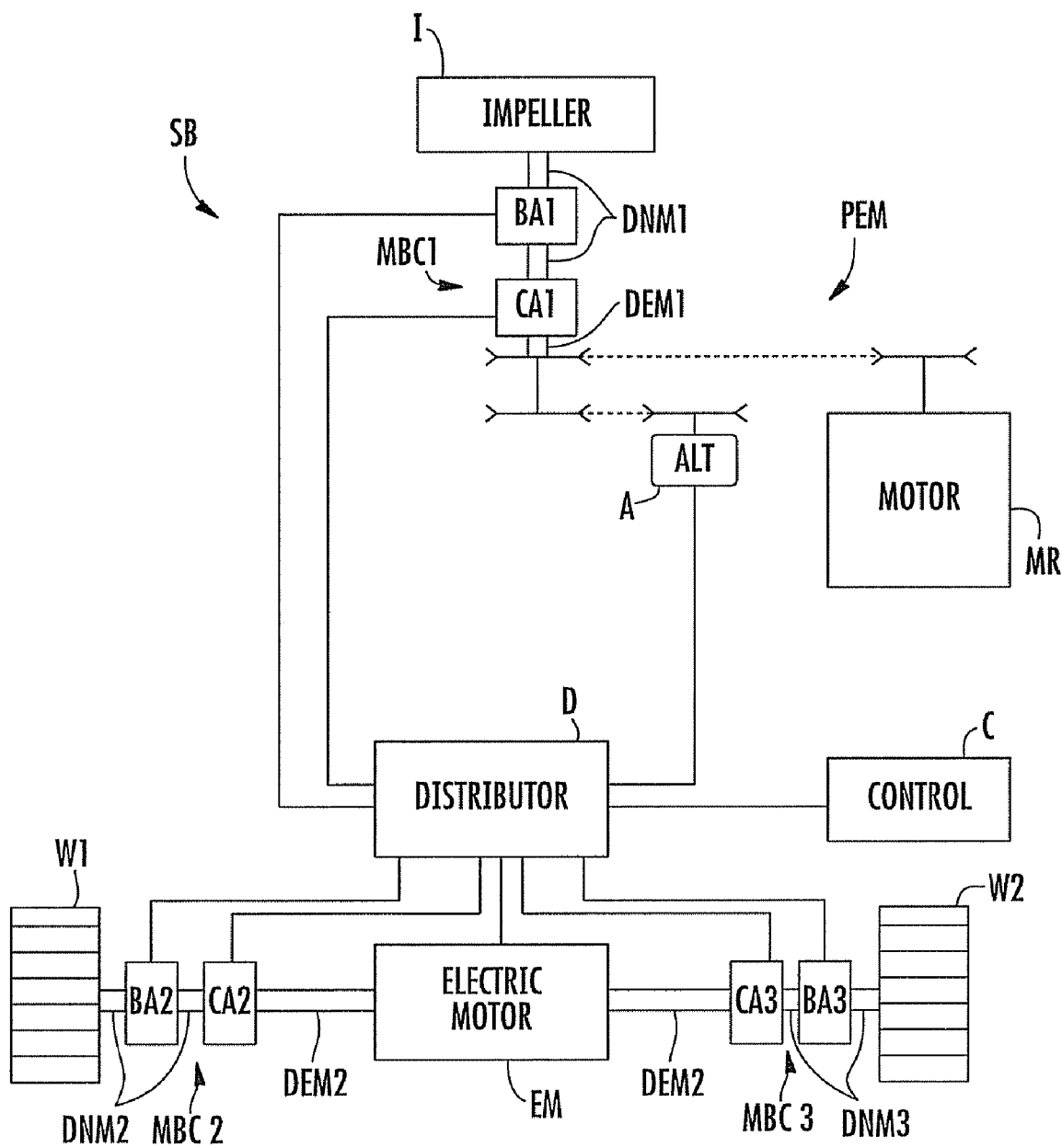
FIG. 9 is a schematic diagram of a snow blower including multiple MR brake-clutch apparatuses for individually controlling an impeller and wheels according to an embodiment of the subject matter disclosed herein.

FIG. 9 is a schematic diagram of a snow blower generally designated SB including multiple MR brake-clutch apparatuses for individually controlling an impeller and drive wheels according to an embodiment of the subject matter disclosed herein. Referring to FIG. 9, snow blower SB can include an internal combustion motor MR and an impeller I. Impeller I can be operably connected to motor MR via MR brake-clutch generally designated MBC1 and a pulley-endless member assembly generally designated PEM. Impeller I can be controllably powered and braked by MR brake-clutch MBC1. In particular, MR brake-clutch MBC1 can include a clutch assembly CA1 being operably connected to a drive member DEM1 and a driven member DNM1 for variable control of the rotation of impeller, which can be operably connected to driven member DNM1. Further, MR brake-clutch MBC1 can include a brake assembly BA1 for braking of impeller I.

Snow blower SB can include drive wheels W1 and W2 operably connected to an electric motor EM, a drive member DEM2, and driven members DNM2 and DNM3, respectively. Electric motor EM can be a DC motor operably connected to a distributor D and configured for rotating drive member DEM. MR brake-clutches MBC2 and MBC3 can be operably connected to driven members DNM2 and DNM3, respectively. Drive wheels W1 and W2 can be controllably powered and braked by MR brake-clutches MBC2 and MBC3, respectively. In particular, MR brake-clutches MBC2 and MBC3 can include clutch assemblies CA2 and CA3, respectively, being operably connected to drive members DEM2 and DEM3, respectively, and driven members DNM2 and DNM3 for variable control of wheels W2 and W3, respectively. Further, MR brake-clutches MBC2 and MBC3 can include brake assemblies BA2 and BA3 for braking of drive wheels W1 and W2, respectively.

A control C can be operated by an operator to send signals to distributor D for operating impeller I and drive wheels W1 and W2. Distributor D can be operably powered by an alternator A via a wheel-belt assembly. In particular, control C can include one or more bails, mechanical components, and/or electronic circuitry for receiving input from an operator for varying electrical signals communicated to MR brake-clutches MBC1, MBC2, and MBC3. The brake and clutch assemblies can be controlled for varying the braking of driven members and for varying the engagement of drive members with respective driven members. MR brake-clutches MBC1, MBC2, and MBC3 can include electromagnets that can be electrically controlled for varying the strength of electrical fields applied to the MR fluid. Thereby, the braking of driven members and the engagement of drive members with respective driven members can be varied. Further, the magnetic generation assemblies of MR brake-clutches MBC1, MBC2, and MBC3 can be individually controlled to apply magnetic fields for engaging respective drive members with driven members for independently engaging drive wheel W1, drive wheel W2, and/or impeller I. As a result, an operator can independently control impeller I and drive wheels W1 and W2.

Figure 10:
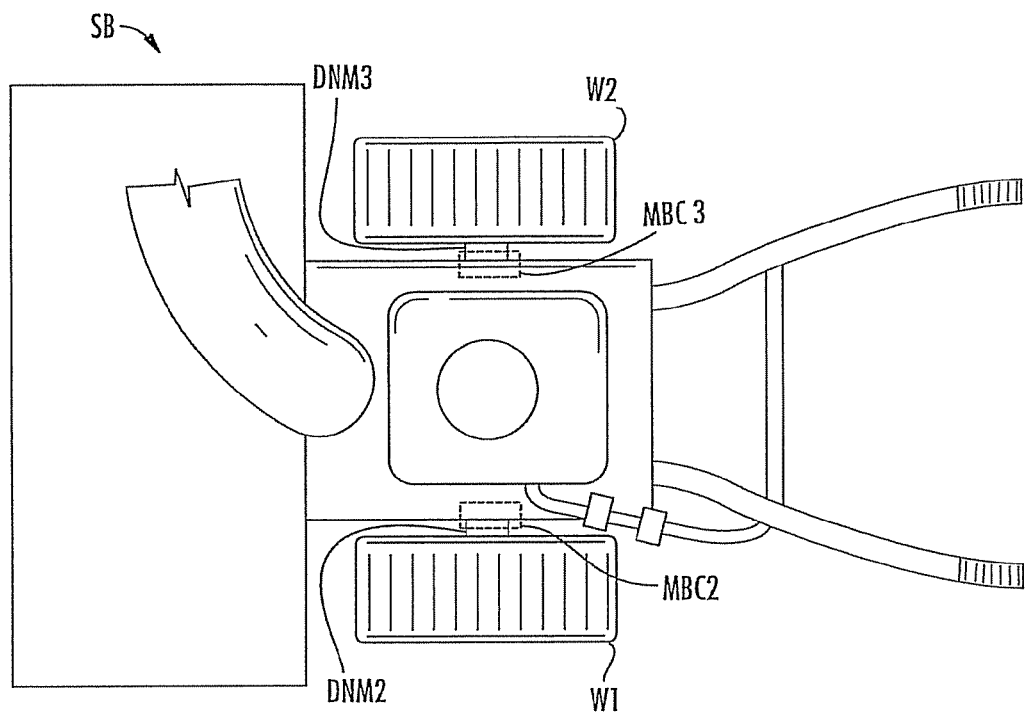
FIG. 10 is a top view of a snow blower including MR brake-clutches operably connected to wheels according to an embodiment of the subject matter disclosed herein.

FIG. 10 is a top view of a snow blower generally designated SB including MR brake-clutches operably connected to wheels according to an embodiment of the subject matter disclosed herein. Referring to FIG. 10, snow blower SB can include drive wheels W1 and W2 being operably connected to driven members DNM1 and DNM2, respectively, which can be operably connected to MR brake-clutches MBC1 and MBC2, respectively. Snow blower SB can include a drive member (not shown) that can be rotated by an electric motor. The drive member can be operably connected to MR brake-clutches MBC1 and MBC2 for continuously varying engagement of driven members DNM1 and DNM2 with the drive member and for continuously varying engagement of driven members DNM1 and DNM2 with the brake assemblies of MR brake-clutches MBC1 and MBC2, respectively.

Figure 11:
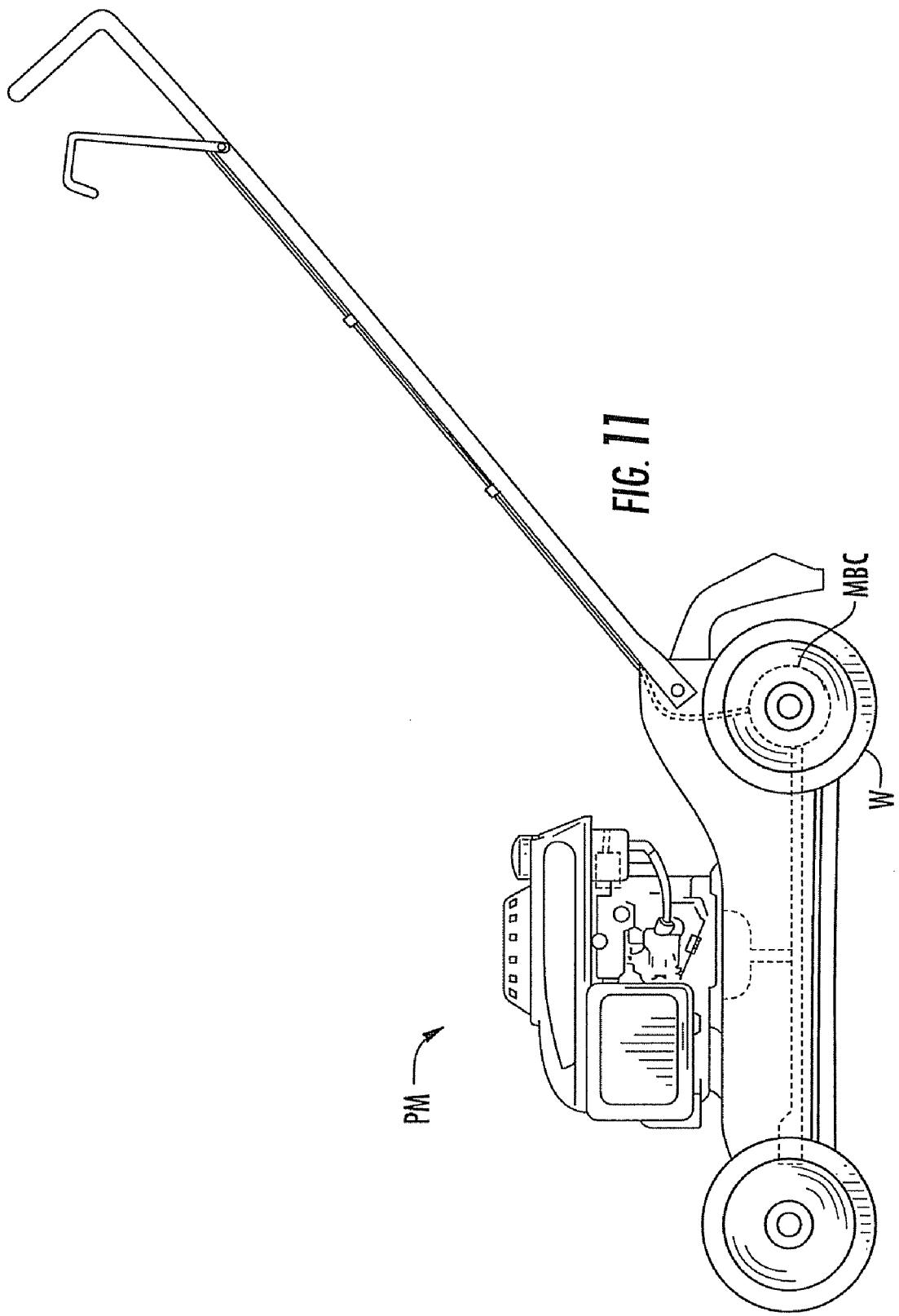
FIG. 11 is a side view of a push mower including MR brake-clutches operably connected to wheels according to an embodiment of the subject matter disclosed herein.

FIG. 11 is a side view of a push mower generally designated PM including MR brake-clutches operably connected to wheels according to an embodiment of the subject matter disclosed herein. Referring to FIG. 11, push mower PM can include a drive wheel W being operably connected to a driven member (not shown), which is operably connected to an MR brake-clutch MBC. Push mower PM can include a drive member (not shown) that can be rotated directly or indirectly from the engine. The drive member can be operably connected to MR brake-clutch MBC for continuously varying engagement of the driven member with the drive member and for continuously varying engagement of the driven member with the brake assembly of MR brake-clutch MBC.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A magneto-rheological (MR) clutch system comprising:
    first and second drive members;
    a first driven member spaced from the first drive member such that a first gap is present between the first drive member and the first driven member;
    a second driven member spaced from the second drive member such that a second gap is present between the second drive member and the second driven member;
    a drive wheel and a snow blower impeller being operably connected to the first and second driven members, respectively;
    first and second quantities of MR fluid disposed in the first and second gaps, respectively; and
    first and second magnetic field generation assemblies comprising first and second magnets, respectively, the first magnetic field generation assembly being operable to apply a first magnetic field to the first quantity of MR fluid to engage the first drive member with the first driven member for engaging the drive wheel, and the second magnetic field generation assembly being operable to apply a second magnetic field to the second quantity of MR fluid to engage the second drive member with the second driven member for engaging the snow blower impeller, the engagement of the snow blower impeller and the engagement of the drive wheel being independently controllable;
    wherein the first magnet is selectively positionable with respect to the first quantity of MR fluid for controlling engagement of the first driven member with the first drive member, and wherein the second magnet is selectively positionable with respect to the second quantity of MR fluid for controlling engagement of the second driven member with the second drive member.

2. The MR clutch system of claim 1 wherein the first and second drive members comprise first and second drive rotors, respectively, positioned in the first and second quantities of MR fluid, respectively.

3. The MR clutch system of claim 1 wherein the first and second driven members comprise first and second driven rotors, respectively, positioned in the first and second quantities of MR fluid, respectively.

4. The MR clutch system of claim 1 wherein the first and second magnets comprise first and second electromagnets, respectively, the first electromagnet configured to apply the first magnetic field to the first quantity of MR fluid, the second electromagnet configured to apply the second magnetic field to the second quantity of MR fluid.

5. A magneto-rheological (MR) brake system comprising:
    first and second driven members;
    a drive wheel and a snow blower impeller being operably connected to the first and second driven members, respectively;
    a first brake assembly defining a first chamber having a first quantity of MR fluid disposed therein and having a first braking structure positioned in the first chamber and connected to the first driven member;
    a second brake assembly defining a second chamber having a second quantity of MR fluid disposed therein and having a second braking structure positioned in the second chamber and connected to the second driven member; and
    first and second magnetic field generation assemblies, the first magnetic field generation assembly being operable to apply a first magnetic field to the first quantity of MR fluid for controlling engagement of the first braking structure with the first brake assembly to brake the drive wheel, and the second magnetic field generation assembly operable to apply a second magnetic field to the second quantity of MR fluid for controlling engagement of the second braking structure with the second brake assembly to brake the snow blower impeller.

6. The MR brake system of claim 5 wherein the first and second magnetic field generation assemblies comprise first and second magnets, respectively, the first magnet being selectively positionable with respect to the first MR fluid for controlling engagement of the first braking structure with the first brake assembly, and the second magnet being selectively positionable with respect to the second MR fluid for controlling engagement of the second braking structure with the second brake assembly.

7. The MR brake system of claim 5 wherein the first and second magnetic field generation assemblies comprise first and second electromagnets, respectively, the first electromagnet being configured to apply the first magnetic field to the first quantity of MR fluid, and the second electromagnet being configured to apply the second magnetic field to the second quantity of MR fluid.

8. A transmission apparatus for power equipment, comprising:

a first motor, a second motor, a drive wheel, and a snow blower impeller;

first and second drive members, the first drive member operably connected to the first motor and the second drive member operably connected to the second motor;

a first driven member spaced from the first drive member such that a first gap is present between the first drive member and the first driven member, the first driven member being connected to the drive wheel;

a second driven member spaced from the second drive member such that a second gap is present between the second drive member and the second driven member, the second driven member being connected to the snow blow impeller;

first and second quantities of MR fluid disposed in the first and second gaps, respectively;

first and second magnetic field generation assemblies, the first magnetic field generation assembly being operable to apply a first magnetic field to the first quantity of MR fluid to engage the first drive member with the first driven member for engaging the drive wheel, and the second magnetic field generation assembly being operable to apply a second magnetic field to the second quantity of MR fluid to engage the second drive member with the second driven member for engaging the snow blower impeller, the engagement of the snow blower impeller and the engagement of the drive wheel being independently controllable;

a brake assembly defining a chamber having a third quantity of MR fluid disposed therein and having a braking structure positioned in the chamber and connected to the second driven member; and a third magnetic field generation assembly configured to selectively apply a third magnetic field to the third quantity of MR fluid to control engagement of the braking structure with the brake assembly to brake the second driven member and the snow blower impeller.

9. A magneto-rheological (MR) clutch system comprising:

a drive member;

at least one driven member spaced from the drive member such that a gap is present between the drive and driven members;

a mower blade being operably connected to the driven member;

a quantity of MR fluid disposed in the gap present between the drive and driven members; and a magnetic field generation assembly operable to apply a magnetic field to the quantity of MR fluid to engage the drive member with the driven member for engaging the mower blade, the magnetic field generation assembly comprising a magnet selectively positionable with respect to the MR fluid for controlling engagement of the driven member with the drive member.

10. The MR clutch system of claim 9 wherein the quantity of MR fluid is a first quantity of MR fluid;

wherein the MR clutch system comprises a brake assembly defining a chamber having a second quantity of MR fluid disposed therein and having a braking structure positioned in the chamber and connected to the driven member; and wherein the magnetic field generation assembly is configured to selectively apply a magnetic field to the second quantity of MR fluid for controlling engagement of the braking structure with the brake assembly to brake the driven member.

11. A magneto-rheological (MR) brake system comprising:

a driven member;

a mower blade being operably connected to the driven member;

a brake assembly defining a chamber having a quantity of MR fluid disposed therein and having a braking structure positioned in the chamber and connected to the driven member; and a magnetic field generation assembly operable to apply a magnetic field to the quantity of MR fluid to control engagement of the braking structure with the brake assembly to brake the mower blade, the magnetic field generation assembly comprising a magnet selectively positionable with respect to the MR fluid for controlling engagement of the braking structure with the brake assembly.

12. The MR brake system of claim 11 wherein the magnet comprises an electromagnet configured to apply the magnetic field to the quantity of MR fluid.

* * * * *